US006636732B1

(12) United States Patent
Boling et al.

(10) Patent No.: US 6,636,732 B1
(45) Date of Patent: Oct. 21, 2003

(54) EMERGENCY PHONE WITH SINGLE-BUTTON ACTIVATION

(75) Inventors: Brian M. Boling, Knoxville, TN (US); Michael C. Bernstein, Knoxville, TN (US); Nicolas A. Natale, Knoxville, TN (US)

(73) Assignee: SecureAlert, Inc., Knoxville, TN (US)

( * ) Notice: Subject to any disclaimer, the term of this patent is extended or adjusted under 35 U.S.C. 154(b) by 0 days.

(21) Appl. No.: 09/538,364

(22) Filed: Mar. 29, 2000

Related U.S. Application Data (63) Continuation-in-part of application No. 09/495,080, filed on Jan. 31, 2000, now abandoned, which is a continuation of application No. 09/044,497, filed on Mar. 19, 1998, now Pat. No. 6,044,257.

(51) Int. Cl.⁷ .............................................. H04M 11/04
(52) U.S. Cl. ....................... 455/404; 455/434; 455/552; 455/564
(58) Field of Search ................................ 455/404, 456, 455/434, 423, 67.1, 552, 553, 521, 161.1, 161.2, 161.3, 550, 575, 90, 564; 342/357.1, 357.12, 357.06

(56) References Cited

U.S. PATENT DOCUMENTS

| 5,203,009 A | 4/1993 | Bogusz et al. |
| 5,235,320 A | 8/1993 | Romano |
| 5,305,370 A | 4/1994 | Kearns et al. |
| 5,334,974 A | 8/1994 | Simms et al. |
| 5,365,570 A | 11/1994 | Boubelik |
| 5,377,256 A | 12/1994 | Franklin et al. |
| 5,388,147 A | 2/1995 | Grimes |
| 5,465,388 A | 11/1995 | Zicker |
| 5,479,482 A | 12/1995 | Grimes |
| 5,542,100 A | 7/1996 | Hatakeyama |
| 5,687,215 A | 11/1997 | Timm et al. |
| 5,694,452 A | 12/1997 | Bertolet |
| 5,742,666 A | 4/1998 | Alpert |
| 5,828,292 A | 10/1998 | Kokhan |
| 5,873,040 A | 2/1999 | Dunn et al. |
| 5,983,115 A * | 11/1999 | Mizikovsky ................ 455/434 |
| 5,995,847 A | 11/1999 | Gergen |
| 6,025,779 A | 2/2000 | Huang |
| 6,026,300 A | 2/2000 | Hicks |
| 6,035,217 A | 3/2000 | Kravitz |
| 6,115,597 A * | 9/2000 | Kroll et al. ................. 455/404 |

* cited by examiner

*Primary Examiner*—Lester G. Kincaid
(74) *Attorney, Agent, or Firm*—Luedeka, Neely & Graham, P.C.

(57) ABSTRACT

An emergency-use-only cellular phone provides for contacting and establishing full duplex voice communication with emergency personnel at an emergency response center with the press of a single activation button. When the activation button is pressed a first time, the following functions are initiated: (1) electrical power from a power supply is provided to a cellular transmitter and receiver, (2) the cellular receiver is activated to search for an available channel from among A or B cellular system channels, (3) an emergency telephone number is accessed from memory, and (4) the cellular transmitter is activated to establish communication with the emergency response center. Since all of these functions are initiated by pressing a single activation button, communication with the emergency response center may be established simply and speedily, even under stressful conditions.

19 Claims, 10 Drawing Sheets

EMERGENCY PHONE WITH SINGLE-BUTTON ACTIVATION

This application is a continuation-in-part of patent application Ser. No. 09/495,080, filed Jan. 31, 2000, now abandoned, entitled PANIC BUTTON PHONE, which is a continuation of patent application Ser. No. 09/044,497, filed Mar. 19, 1998, which issued as U.S. Pat. No. 6,044,257, entitled PANIC BUTTON PHONE.

FIELD OF THE INVENTION

In general, the present invention relates to an emergency phone that has a single activation button for establishing cellular telephone contact with an emergency response center. In particular, the present invention relates to a portable cellular device that produces an audible alarm, establishes radio communication with a home alarm base station, establishes full duplex voice communication with the emergency response center, and provides the emergency response center with the location of the portable cellular device.

BACKGROUND OF THE INVENTION

Emergency response numbers such as 911 are utilized to provide individuals with a quick and easy way to contact an emergency response center when an emergency situation arises. By providing a standardized method of contacting emergency personnel, these emergency response numbers are effective in reducing the amount of time necessary to respond to an emergency. In an emergency, the amount of time required to respond can often mean the difference between life and death. Response time may be further minimized by employing caller identification technology that allows the operator of the emergency response center to automatically determine the phone number of the caller without requiring the caller to provide such information. If the call was placed from a stationary telephone, the operator at the emergency response center can also determine the location of the caller. Thus, even if the user is unable to verbally request assistance, the emergency response center can still send emergency response personnel to the location from which the call was placed.

One of the primary shortcomings of the prior art devices for utilizing the 911 emergency response system is that a phone terminal is needed to contact an emergency response center. If the emergency situation occurs in a remote area, it is often impossible to place a call to the emergency response system. However, with the advent of cellular telephone technology it is now possible to carry a cellular telephone that allows an emergency caller to contact an emergency response center from practically anywhere. The primary drawbacks of the cellular system are the high cost of cellular service and the inability of the emergency response center to automatically determine the location of the caller.

Cellular devices and services have been offered that are limited to emergency use only. These devices have several buttons that allow a variety of emergency services such as fire, medical and police to be summoned. By restricting use of the cellular phone to emergency situations, the user can either avoid or defer some of the costs associated with a full service cellular phone. However, these devices have multiple buttons and functions which may cause confusion in an emergency situation. Because of the stress often associated with emergency situations, an operator of such a complex emergency communication device may fail to properly summon emergency personnel. In addition, these emergency communication devices fail to integrate the functioning of the cellular device with a home alarm system that the user of the device might have. Furthermore, the devices do not have the capability to summon individuals in the immediate area around the device that may be able to provide assistance.

SUMMARY OF THE INVENTION

The present invention eliminates the oversights, difficulties, and disadvantages of the prior art by providing a simplified emergency communication apparatus for contacting and establishing full duplex voice communication with emergency personnel at an emergency response center. The apparatus includes a single activation button that, when pressed a first time, initiates the following functions: (1) electrical power from a power supply is provided to a cellular transmitter and receiver, (2) the cellular receiver is activated to search for an available cellular system channel, and (3) the cellular transmitter is activated to establish communication with the emergency response center. Since all of these functions are initiated by the pressing of a single activation button, communication with the emergency response center may be established simply and speedily, even under stressful conditions.

The invention includes a rigid housing with the cellular transmitter contained therein. When activated, the transmitter is operable to establish communication with only the emergency response center, thereby reducing or eliminating costs associated with non-emergency cellular phone service. The cellular receiver receives an incoming cellular signal from the emergency response center and conditions the incoming cellular signal to produce an incoming voice signal. A speaker receives the incoming voice signal and produces audible sound based thereon. The apparatus also includes a microphone for producing an outgoing voice signal based on audible speech of the operator whereby the operator may respond to the incoming cellular signal from the emergency response center. Based on the outgoing voice signal, the cellular transmitter generates the outgoing cellular signal for broadcast to the emergency response center.

By limiting use of the emergency phone to emergency situations, a user should be able to subscribe to a cellular service for a greatly reduced fee. In fact, present FTC regulations prohibit charging for, or refusing to connect, a call made to a 911 emergency response center. Thus, the emergency phone could presently be used without incurring any subscriber fees at all. More importantly, placing only a single large activation button on the emergency phone makes contacting an emergency response center exceedingly simple. Establishing a 911 emergency call using the emergency phone of the present invention requires only a single press of the activation button. In contrast, a conventional cellular phone requires at least six presses of four different buttons to make a 911 call. Thus, even in an extremely stressful emergency situation, the emergency phone is almost impossible to operate incorrectly. Furthermore, the simplicity of the emergency phone makes it especially adaptable for use by young children and physically and mentally impaired individuals.

In another aspect, the invention provides a method of establishing full-duplex cellular telephone communication between a portable cellular communication apparatus and an emergency response center, where the portable cellular communication apparatus includes a single activation button disposed beneath a movable protective cover, a cellular transmitter, a cellular receiver, a microprocessor, a memory device, a microphone, a speaker, and a battery. The method includes opening the protective cover to expose the single activation button, and applying pressure to the activation button at a first time and holding the pressure for a minimum time period. When pressure is applied to the activation button for the minimum time, the following steps are initiated, at least some of which may occur simultaneously: providing electrical power from the battery to the microprocessor, the receiver, and the transmitter; retrieving a telephone number associated with the emergency response center from the memory device; determining whether the portable cellular communication apparatus is within communication range of a cellular telephone system; and transmitting an outgoing cellular signal to establish cellular communication with the emergency response center. The method further includes receiving an incoming cellular signal from the emergency response center in response to the outgoing cellular signal, producing an incoming voice signal based on the incoming cellular signal, providing the incoming voice signal to the speaker, and producing audible sound from the speaker based on the incoming voice signal. The method also includes speaking into the microphone in response to the sound from the speaker, producing an outgoing voice signal from the microphone based on the speaking, providing the outgoing voice signal to the cellular transmitter, and transmitting the outgoing cellular signal to the emergency response center based on the outgoing voice signal. In this manner, the method provides for establishing full-duplex voice communication with the emergency response center with one press of a single activation button.

BRIEF DESCRIPTION OF THE DRAWINGS

Other objects, features and advantages of the present invention will become apparent by reference to the following detailed description when considered in conjunction with the accompanying drawings, in which like reference characters refer to like parts throughout the views, and wherein.

DETAILED DESCRIPTION

Figures 1, 2:
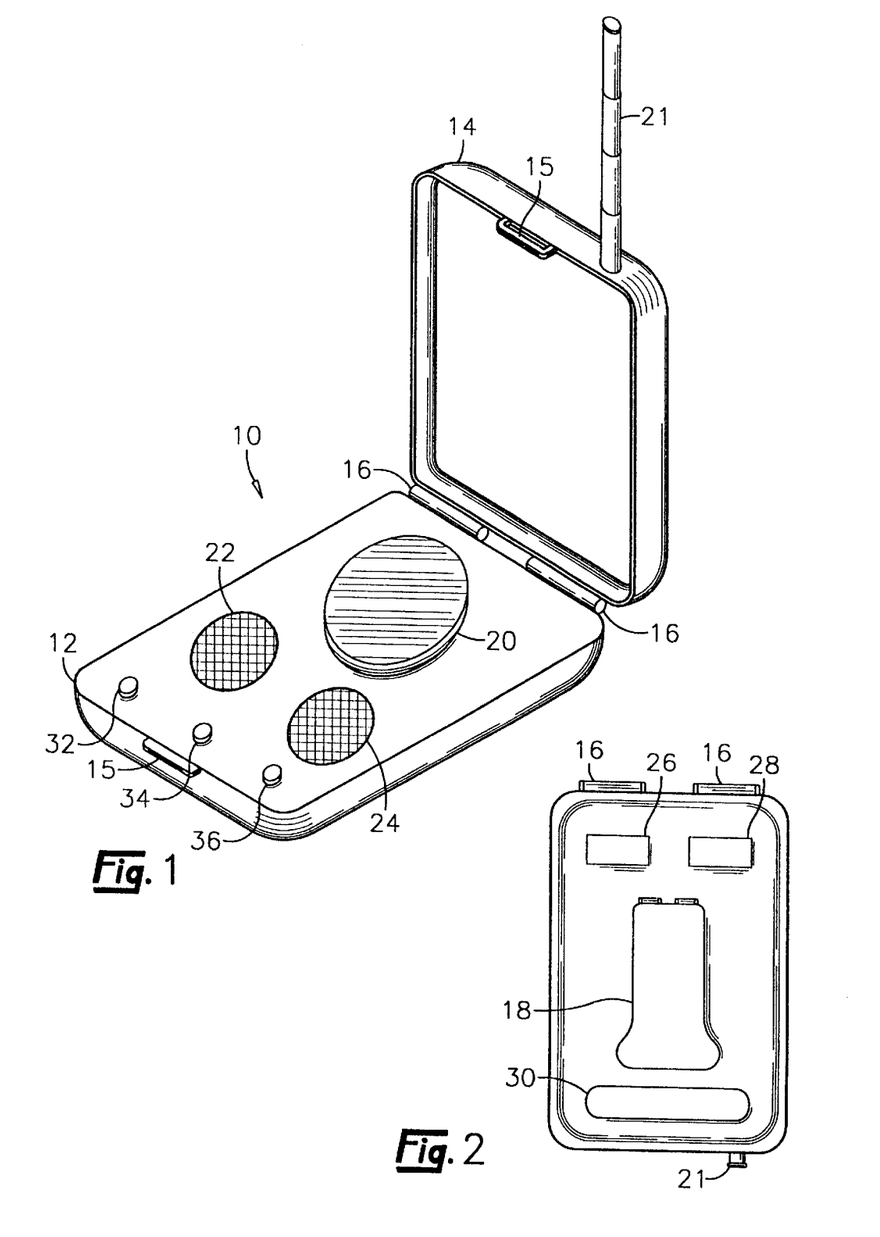
FIG. 1 depicts a isometric view of an emergency phone with a flip top cover in the open position according to one embodiment of the invention.
FIG. 2 depicts a top view of the emergency phone of FIG. 1 with the flip top cover in the a closed position according to one embodiment of the invention.

Referring to FIGS. 1 and 2, an embodiment of an emergency communication apparatus 10 for summoning help in an emergency is shown. The internal components of the emergency communication apparatus 10, also referred to herein as an emergency phone 10, are contained within a rigid housing 12. The rigid housing 12 is preferably constructed of a durable material that will withstand being continuously carried in an individuals pocket or purse. Preferably, a flip top cover 14 is connected to the rigid housing 12 by a pair of hinges 16. In one embodiment, the flip top cover 14 folds over the rigid housing 12, and is spring loaded in the closed position where it is held in place by a latch 15. When the latch 15 is pressed, the flip top cover 14 is released and springs open to reveal the top of the rigid housing 12. A clip 18 is provided on the outside of the flip top cover 14 that allows the emergency phone 10 to be carried on the waistband or belt of a user.

The flip top cover 14 covers a single large activation switch or button 20 when it is in the closed position, thereby preventing the activation button 20 from being accidentally pressed. The single activation button 20 activates the emergency phone 10 when it is pressed. To summon help in an emergency situation, a user first opens the flip top cover 14 to reveal the button 20. In one embodiment, as soon as the flip top cover 14 is opened, the emergency phone 10 begins searching for a cellular provider. Once a communication channel is assigned to the emergency phone 10 by a cellular telephone provider, pressing the single activation button 20 will cause the emergency phone 10 to automatically contact an emergency response center such as the familiar 911 service. A radio frequency antenna 21 mounted on the flip top cover 14 is used to transmit and receive the cellular communications. The antenna 21 is preferably retractable so that the emergency phone 10 is compact and can be easily stored in a pocket or purse without worrying about damaging the antenna 21. A speaker 22 and a microphone 24 located on the rigid housing 12 of the emergency phone 10 enable the operator of the emergency phone 10 to establish full duplex voice communications with the personnel at the emergency response center. In an alternate embodiment, the microphone 24 is located on the outside of the flip top cover 14 and the speaker 22 is replaced with a tethered ear piece that is placed in the ear of the operator.

In order to minimize the cost of the cellular service needed to support it, the emergency phone 10 is strictly limited to emergency use only. Because a cellular service provider can be sure that the emergency phone 10 will only be used in emergency situations, the service provider will typically be willing to provide the cellular service at a reduced rate. Furthermore, governmental regulations prohibit cellular service providers from refusing calls to 911 emergency response centers even if the caller does not subscribe to a cellular service. Another one of the primary benefits of limiting use of the emergency phone 10 to contacting an emergency response center with the single activation button 20 is the resulting simplicity of operation.

The single activation button 20 is preferably one quarter to one and one half inches in diameter. Even very young children and elderly consumers can be taught how to summon emergency personnel with the emergency phone 10. Additionally, the time required to summon the emergency personnel is held to an absolute minimum. Almost as soon as the activation button 20 is pressed, the emergency response center personnel have a verbal communications link to the scene of the emergency. Furthermore, as discussed in more detail below, the emergency phone 10 may include a locator function which uses global positioning systems (GPS) and cellular location systems to provide the location of the emergency phone 10 to the emergency response center.

In addition to establishing cellular contact with an emergency response center, the emergency phone 10 may be configured to activate the home security system of the user. Because the radio communications range of the emergency phone 10 is limited, the emergency phone 10 can only contact the user's home security system when the emergency phone 10 is close to the home security system. Preferably, the radio communications range of the emergency phone 10 extends to at least 500 feet from the home security system. The home security system can react to the emergency phone's signal in a number of ways. In the preferred embodiment, the home security system turns the lights of the residence on and off and activates any audible alarms that the home security system uses. Turning on and off the house's lights and sounding the home security system's audible alarms can be beneficial for a number of reasons. First, the home security system alarm will only be activated if the emergency phone 10 is pressed when it is near the home. Thus, if the emergency situation involves an intruder or attacker, turning on the lights and sounding the alarms may scare the individual away. Secondly, turning on the lights and sounding the alarms will alert any individuals in or around the house that an emergency situation exists in or near the house. In addition, any of the variety of other functions typically performed by a home security system can be triggered by the signal from the emergency phone 10.

An embodiment of the emergency phone 10 is also provided that contacts the car alarm of the user. In a manner similar to that described for contacting the home security system of the user, the emergency phone 10 transmits a signal that activates the car alarm. The emergency phone 10 will only be able to signal the car alarm if the user is near the car when the emergency phone 10 is activated. Thus, the car alarm will help draw attention to the area in which the emergency situation exists. This could be especially beneficial if the emergency situation arose in a parking lot. Furthermore, if the car was just stolen, setting off the car alarm will draw attention to the thief and the stolen car.

In the embodiment depicted in FIGS. 1 and 2, the speaker 22 is also used as an audible alarm or noise maker that alerts individuals in the immediate area that an emergency exists. In this embodiment, the noise maker is activated by pressing a button 26 on the flip top cover 14 of the emergency phone 10. Once button 26 is pressed the speaker 22 will begin emitting an alarm type noise. The number of different sounds that could be produced is limitless but the noise produced is preferably similar to that produced by a car alarm. In this embodiment, the noise alarm stops producing noise when the flip top cover 14 is opened. Stopping the noise alarm when the flip top cover 14 is opened prevents the noise alarm from overwhelming the operator's voice when the emergency response center is contacted. In an alternate embodiment, the noise alarm is deactivated by pressing the noise alarm button 26 again.

Also located on the flip top cover 14 is a visual alarm button 28 that activates a flashing light source 30 on the flip top cover 14. Both the flashing light source 30 and the noise alarm serve the same functions. On the one hand they serve to scare off attackers, on the other hand they serve to draw attention to the individual requesting emergency assistance. Because the emergency phone 10 can be activated from anywhere that cellular service is available, the exact location of the caller may be unknown to the emergency response personnel. Thus, by drawing attention to the emergency phone 10 and its operator, the flashing light source 30 and the noise maker may be very helpful to emergency response personnel attempting to locate the individual who summoned them.

A set of indicator lights 32, 34 and 36 are preferably located on the front of the rigid housing 12 that provide an operator of the emergency phone 10 information concerning whether or not the emergency phone 10 is within communications range of a cellular station, whether or not the emergency phone 10 has been activated and whether or not the power supply of the emergency phone 10 is running low. In one embodiment, the cellular range indicator light 32 is green when a channel is assigned to the emergency phone 10 by a wireless telephone carrier, and is red when no service is possible. Preferably, the activation light 36 is off when the emergency phone 10 has not been activated and turns red when the phone 10 is activated. The power supply light 34 is off when the power supply is functioning properly and turns yellow to indicate a low power supply.

As described above, a preferred embodiment of the present invention includes a locator function. The locator function provides to the emergency response center the location of the emergency phone 10 at the time it was activated. The locator function is implemented in a variety of manners in different embodiments of the present invention. One embodiment involves the use of a GPS receiver. A GPS receiver utilizes signals from satellites orbiting the earth to determine the position of the receiver. When the single activation button 20 is pressed, the GPS receiver determines the location of the emergency phone 10. The emergency phone 10 then automatically transmits this positional information to the emergency response center. Another embodiment of the present invention uses a cellular location system to determine the position of the emergency phone 10 by triangulation. This cellular location system uses the strength and/or the relative phase of the signal from a cellular device at different cellular stations to determine the location of the cellular device. Positional information is extremely beneficial in an emergency situation because it allows the emergency response center to determine the location of the caller without requiring any input from the caller.

Figure 3:
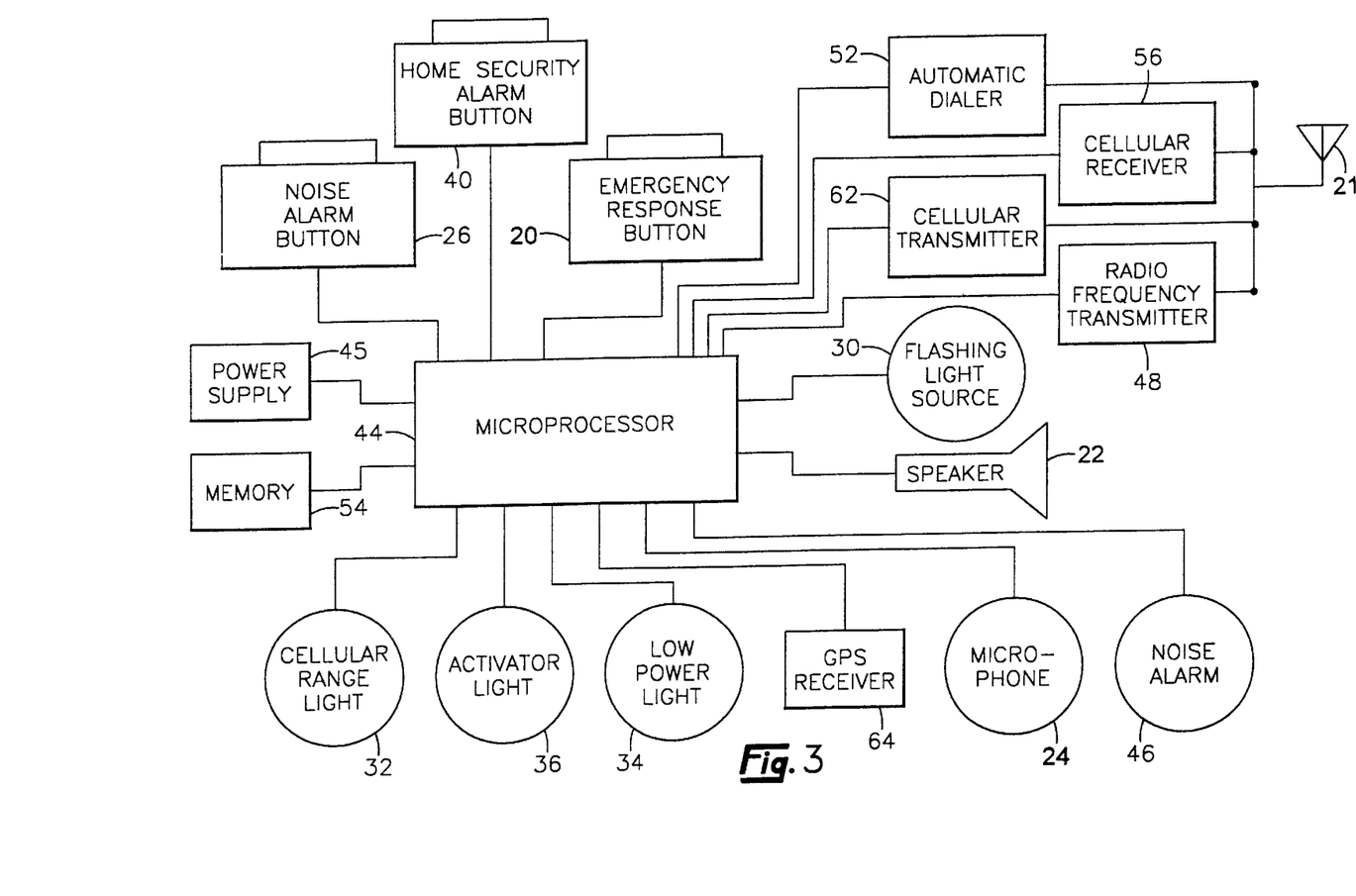
FIG. 3 is a functional block diagram of an emergency phone according to a preferred embodiment of the invention.

Referring now to FIG. 3, a block diagram of the electrical components of a preferred embodiment of the emergency phone 10 is shown. The electrical components of the emergency phone 10 are controlled by a microprocessor 44. Power for the electrical components of the emergency phone 10 is supplied by a power supply 45. In the preferred embodiment, the power supply 45 is a DC power supply consisting of four replaceable AAA alkaline batteries. Alkaline batteries are preferred because they will allow a minimum continuous talk time of at least 30 minutes, are relatively inexpensive, are easily replaceable, and have a relatively long shelf-life between uses. Although lithium and nickel-cadmium batteries are typically the batteries of choice for conventional cellular phones, such batteries require constant recharging to maintain a useable voltage level. Such batteries are not preferred for use as the power supply 45 for the emergency phone 10 because they cannot maintain a charge during long periods of nonuse. Since the emergency phone 10 may be stored away, such as in an automobile glove compartment, for long periods between uses, long-life alkaline batteries are used in the preferred embodiment of the invention.

The embodiment shown has three user input buttons 26, 40 and 20. While the user inputs 26, 40 and 20 are shown and discussed as buttons, it is understood that the inputs 26, 40 and 20 may be a switch, touch sensor, or other similar device that functions like a button.

A noise alarm button 26 is provided that activates a noise alarm 46. When the noise alarm button 26 is pressed, a noise alarm signal is sent to the microprocessor 44. The microprocessor 44 receives the noise alarm signal and produces a noise alarm activation signal that is sent to the noise alarm 46. In this embodiment, the noise alarm 46 preferably consists of a siren-type speaker that creates a high decibel noise. Preferably, the noise alarm 46 can be deactivated by simply pressing the noise alarm button 26 a second time or by opening the flip top cover 14.

In an alternate embodiment, a flashing light source 30 is also provided. The flashing light source 30 is activated in response to the noise alarm button 26 or activation button 20 being pressed. The flashing light source 30 helps to alert individuals in the immediate area that an emergency situation exists. In addition, once emergency response personnel have been summoned, the flashing light source 30 can help the emergency personnel locate the emergency phone 10 and, thus, the individual who summoned the assistance.

A home security alarm button 40 is also provided. When the home alarm button 40 is pressed, a home alarm signal is sent to the microprocessor 44. In response to the home alarm signal, the microprocessor 44 produces an activation signal which is sent to a radio frequency transmitter 48. The radio frequency transmitter 48 conditions the activation signal and broadcasts it on an antenna 21. The preferred radio frequency transmitter 48 operates at 310 MHz. The home security system detects the broadcast activation signal and responds accordingly. As discussed in greater detail above, the response preferably at least includes turning on and off the exterior lights of the house and producing an audible alarm.

In one embodiment, when pressed, the activation button 20 causes the microprocessor 44 to activate an automatic dialer 52, and the automatic dialer 52 dials the telephone number of the emergency response center. The telephone number is preferably stored in the automatic dialer 52 itself. However, in an alternate embodiment a memory 54 is provided for storing the telephone number. A cellular receiver 56 receives an incoming cellular signal from the emergency response center and conditions the incoming signal to produce an incoming voice signal. The cellular receiver 56 may provide the voice signal to the speaker 22 directly or through the microprocessor 44 as shown in FIG. 2. The operator of the emergency phone 10 can respond to the incoming signal from the emergency response center by speaking into the microphone 24. The microphone 24 converts the operator's speech into an outgoing voice signal that is received by the microprocessor 44. The microprocessor 44 then sends the outgoing voice signal to a cellular transmitter 62, which generates an outgoing cellular signal based thereon. In an alternate embodiment, the outgoing voice signal is sent directly from the microphone 24 to the cellular transmitter 62.

The emergency phone 10 is designed to use the cellular communications technology that provides the most comprehensive coverage possible. Using the cellular technology that provides the largest possible coverage area is desirable because it minimizes the likelihood the operator of the emergency phone 10 will be out of cellular communications range when an emergency situations arises. While the coverage range of digital cellular service providers is constantly increasing, the largest amount of cellular coverage is still provided by service providers using analog modulation technology. Thus, in the preferred embodiment, the cellular receiver 56 and cellular transmitter 62 use analog modulation technology. Furthermore, because the amount of time actually spent communicating with the emergency phone 10 will likely be very low, the cellular receiver 56 and transmitter 62 components are designed for maximum range and minimal talk times.

In another alternative embodiment, the emergency phone 10 is designed to scan for a digital cellular provider. If a digital cellular service provider is located, the emergency phone 10 will establish digital communications with the digital service provider. If no digital service provider is located, the emergency phone 10 then attempts to establish analog cellular communications with an analog service provider.

In the embodiment of FIG. 3, the microprocessor 44 prompts a GPS receiver 64 to determine the location of the emergency phone 10 when the activation button 20 is pressed. Once the GPS receiver 64 has determined the coordinates of the emergency phone 10, the GPS receiver 64 provides the coordinates to the microprocessor 44. The microprocessor 44 then sends the coordinates to the cellular transmitter 62. The cellular transmitter 62 sends the location coordinates to the emergency response center by way of a cellular telephone network. The location coordinates allow the emergency response center to dispatch emergency personnel to the location from which the call was placed without even questioning the caller.

The microprocessor 44 also controls a set of indicator lights 32, 34 and 36. The set of indicator lights 32, 34 and 36 provide the operator of the emergency phone 10 status information concerning the functioning of the phone 10. As previously discussed, the indicator lights 32, 34 and 36 preferably include a cellular range indicator light 32, a low power light 34, and an activation light 36. However, it is understood that a variety of different indicator lights 32, 34 and 36 could be provided without departing from the spirit of the invention.

Figure 4:
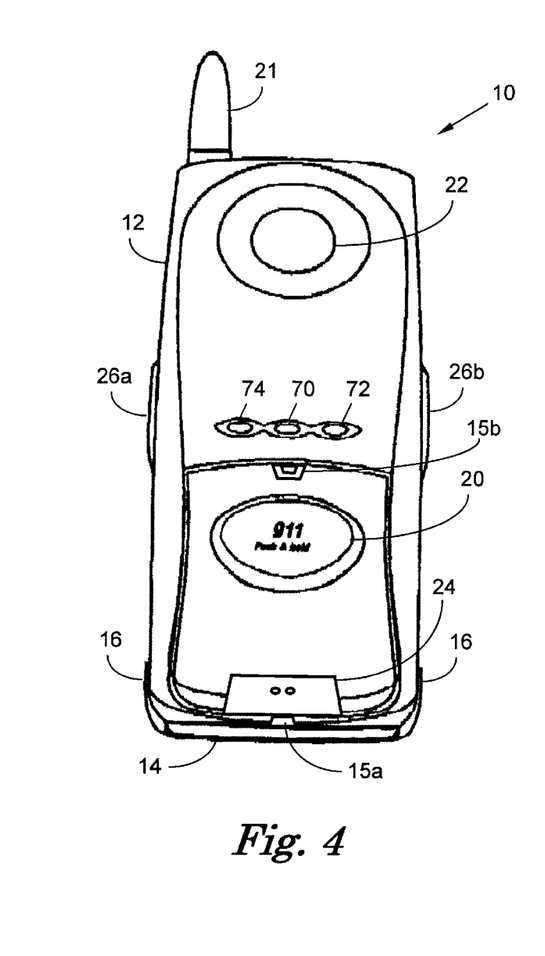
FIG. 4 depicts a top view of the emergency phone with a protective cover in an open position according to a most preferred embodiment of the invention.
Figure 5:
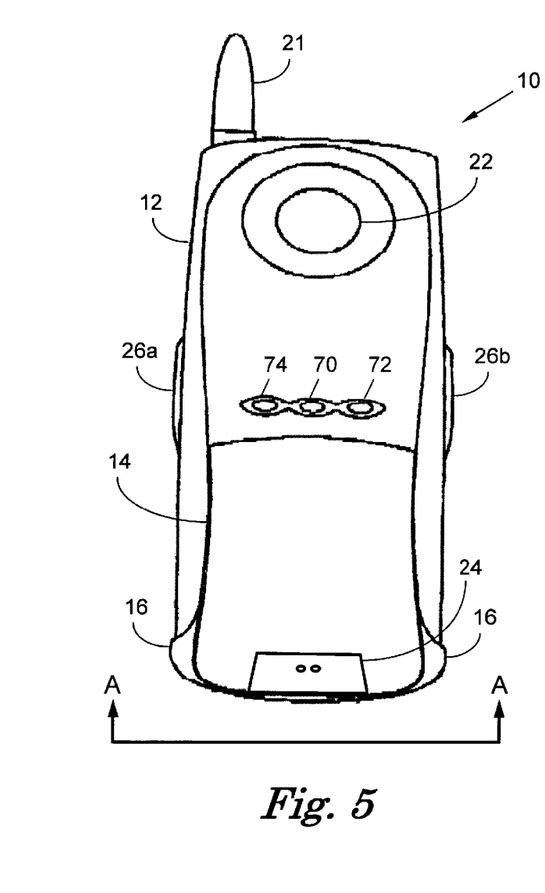
FIG. 5 depicts a top view of the emergency phone with the protective cover in a closed position according to the most preferred embodiment of the invention.
Figure 6:
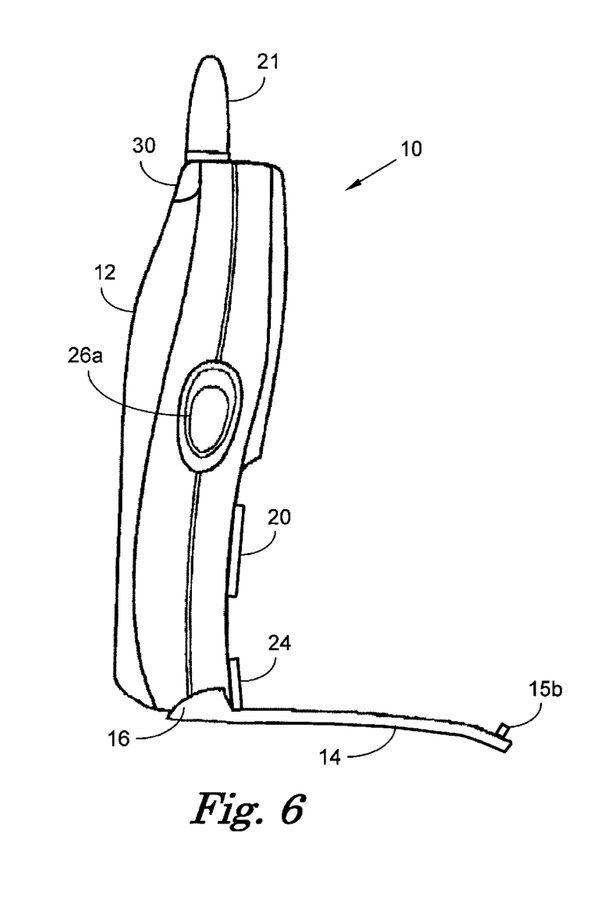
FIG. 6 depicts a side view of the emergency phone with the protective cover in the open position according to the most preferred embodiment of the invention.

FIGS. 4–8 depict a most preferred embodiment of the emergency phone 10. As shown in FIGS. 4 and 6, the single activation button 20 is preferably the only control button disposed beneath the cover 14. Thus, when closed, the cover 14 prevents accidental pressing of the activation button 20 which could inadvertently place a call to the emergency response center. In this embodiment, other functions provided by the phone 10, such as the audible alarm 46 and the flashing emergency light 30, may be activated when the cover 14 is closed.

With reference to FIGS. 4–7, one edge of the protective cover 14 is movably attached to the housing 12 by the hinges 16. At the opposite edge of the cover 14 is a latch tab 15*a* that engages a latch pin 15*b* on the housing when the cover 14 is in the closed position. Preferably, the cover 14 may be opened by applying a gentle pulling force to the cover 14 to disengage the latch pin 15*b* from the latch tab 15*a*.

As shown in FIGS. 4 and 5, the microphone 24 and speaker 22 of this most preferred embodiment are uncovered and functional when the cover 14 is in the open position (FIG. 4) and in the closed position (FIG. 5). This feature allows the user to maintain a conversation with personnel at the emergency response center, even with the cover 14 closed. It may be advantageous in many circumstances to close the cover 14 after pressing the activation button 20, thereby preventing accidental pressing of the button 20 while a call is in progress. As discussed in more detail hereinafter, pressing the button 20 while a call is in progress could terminate the call. Therefore, closing the cover 14 after initiating the call helps to avoid premature termination.

In the most preferred embodiment of the invention, the audible alarm 46 is activated by simultaneously pressing two alarm buttons 26a and 26b. As shown in FIGS. 4–7, these buttons 26a and 26b are located on either side of the housing 12. With reference to FIG. 8, the microprocessor 44 monitors the state of a pair of alarm switches 27a and 27b which change state when the user presses the alarm buttons 26a and 26b. When the microprocessor 44 detects that the alarm switches 27a–b have changed state at the same time, the microprocessor 44 activates the audible alarm 46. As mentioned above, when activated, the audible alarm 46 generates a siren-like audio alarm signal. The speaker 25 converts the audio alarm signal into sound.

Figure 9:
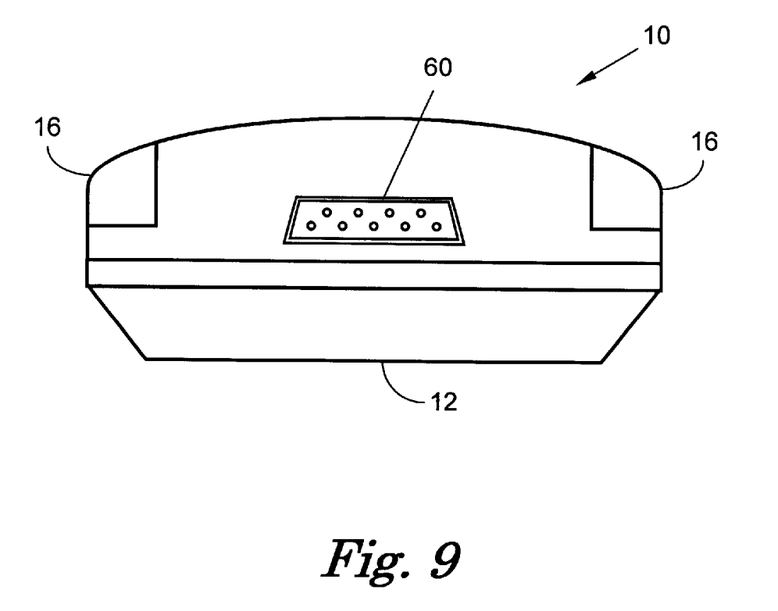
FIG. 9 depicts a narrow side view of the emergency phone with the protective cover in the closed position according to the most preferred embodiment of the invention.

FIG. 9 depicts a preferred embodiment of the emergency phone 10 as viewed from the direction indicated by the arrows A—A in FIG. 5. As shown in FIG. 9, the phone 10 includes an interface port 60 which is accessible from outside the housing 12. As described in more detail below, the interface port 60 provides a programming and data transfer interface to the microprocessor 44.

As shown in FIGS. 4 and 5, the phone 10 of the most preferred embodiment includes three indicator lights 70, 72, and 74. The centermost of the three lights is a low signal indicator light 70, which is preferably a red LED. On the right is a high signal indicator light 72, which is preferably a green LED, and on the left is an in-use indicator light 74, which is preferably a yellow LED. The particular circumstances in which each of these lights is illuminated is described in more detail hereinafter.

Figure 10A:
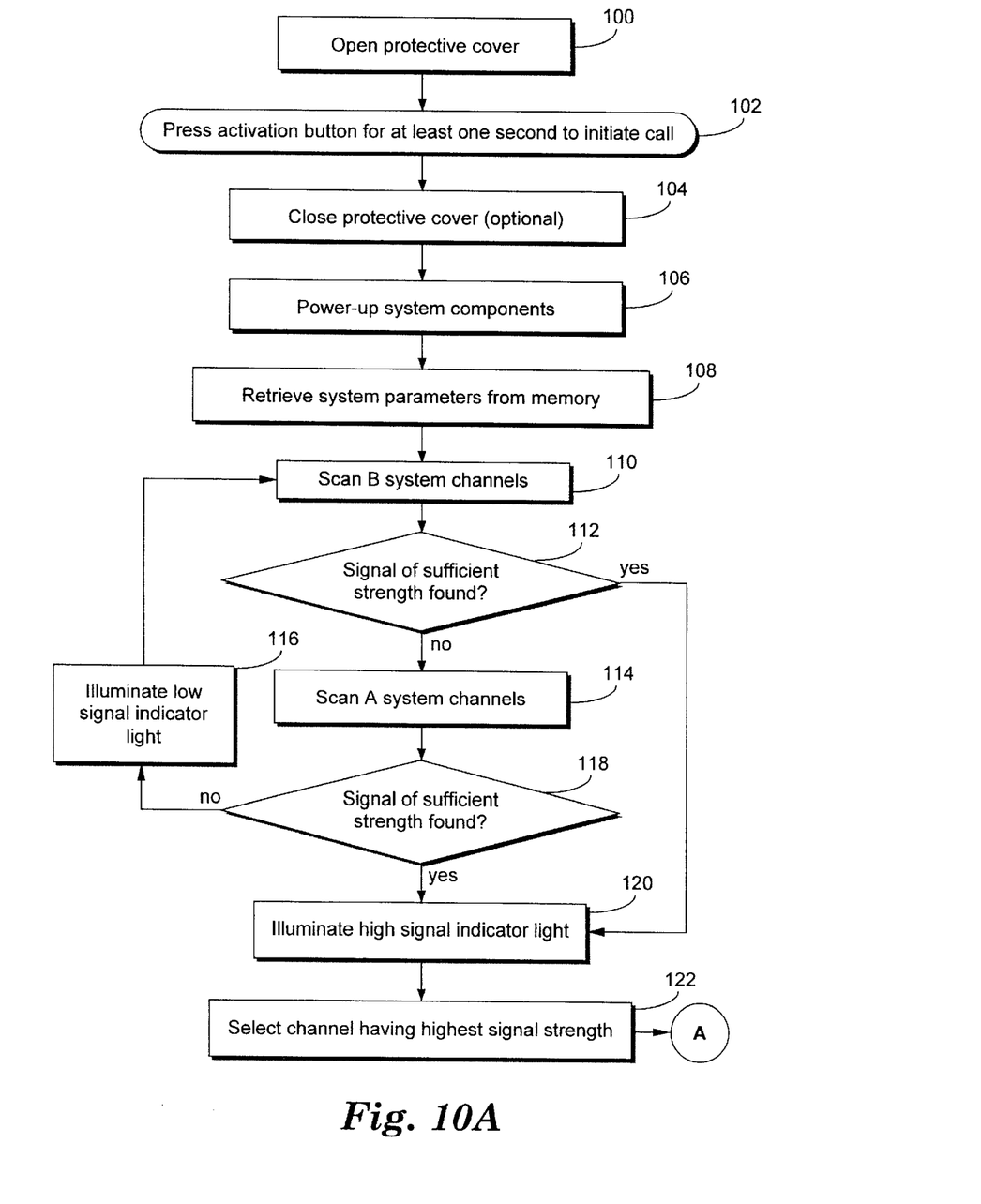
FIGS. 10A and 10B depict a functional flow diagram of a process for establishing an emergency cellular communication with an emergency response center according to a preferred embodiment of the invention.
Figure 10B:
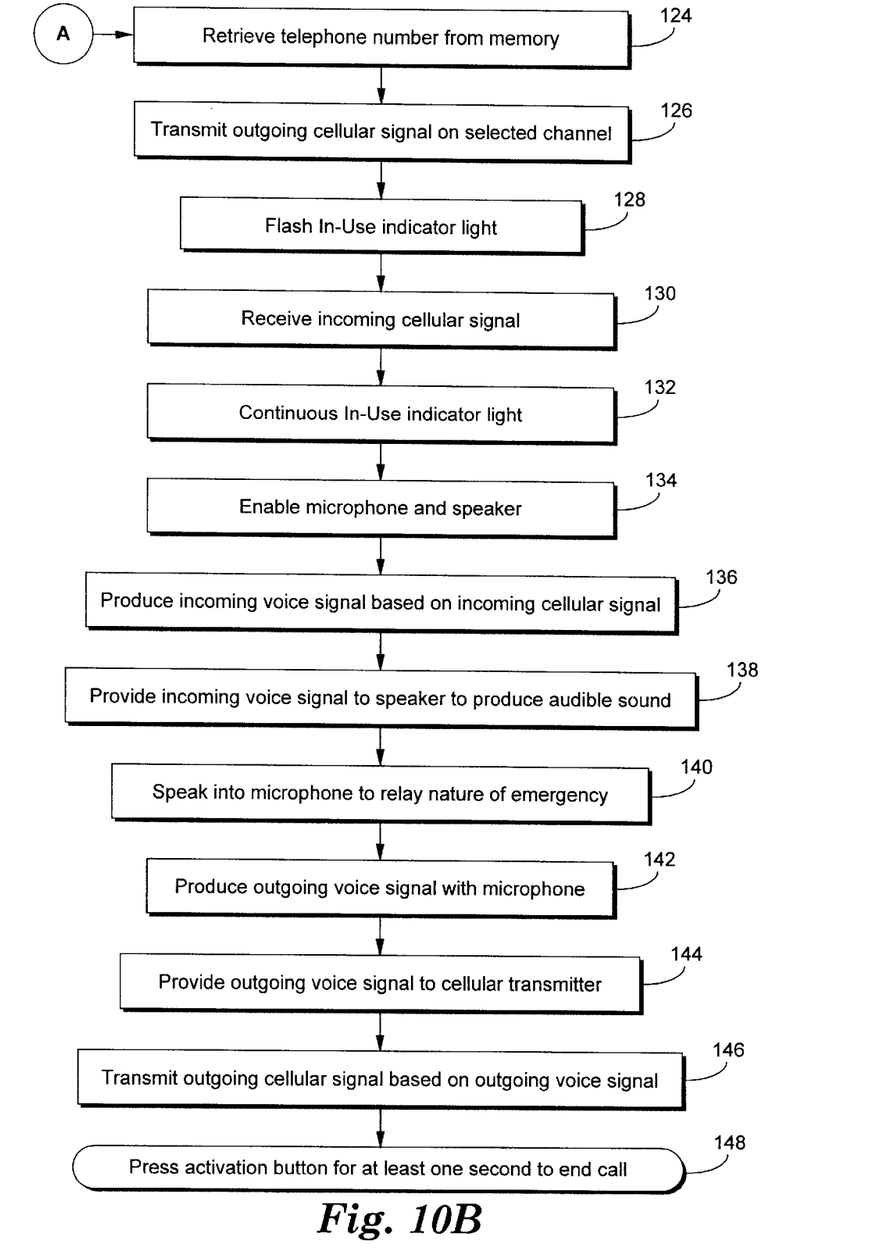

FIGS. 10A and 10B depict a flow diagram of a sequence of events that are set in motion when the activation button 20 is pressed to place an emergency call. To gain access to the activation button 20, the user must first open the protective cover 14 (step 100). With the cover 14 in the open position (as shown in FIGS. 4 and 6), the user presses the activation button 20 and maintains pressure on the button 20 for at least a minimum period of time, such as one second (step 102). The user may then close the cover 14 (step 104) to prevent accidentally terminating the call, which could occur if the button 20 is inadvertently pressed again. Of course, the emergency phone 10 is also operable to complete the call if the cover 14 remains in the open position.

It is assumed for purposes of this description that the phone 10 is in a power-down mode prior to step 102. In other words, the cellular transmitter 62, the cellular receiver 56, and the microprocessor 44 are preferably drawing no power from the power supply 45. When the button 20 is pressed a first time and held for at least the minimum period of time, the phone 10 is powered up (step 106). Preferably, the microprocessor 44 powers-up first and begins executing preprogrammed instructions before power is provided to the receiver 56 and transmitter 62. Alternatively, the microprocessor 44, the receiver 56, and the transmitter 62 receive power simultaneously when the button 20 is pressed and held. In either case, when the microprocessor 44 is powered on, it proceeds to retrieve system operating parameters from the memory device 54 (step 108). These operating parameters preferably include an A/B preference parameter that indicates which cellular system, A or B, is preferred.

As one skilled in the art will appreciate, the A and B cellular systems each include twenty-one cellular channels, with the A system channels occupying one frequency range and the B system channels occupying another frequency range. As required by FCC rules, both of these systems are typically available in large metropolitan areas to provide competition between cellular service providers. In some geographical areas, only one of the systems may be available. If a conventional cellular phone is receiving cellular service from a service provider operating on the A system, that phone will prefer the A system over the B system, and will scan first for an available A system channel. If an A system channel is not available, the conventional phone will then scan for a B system channel. If a B system channel is available, the conventional phone will use the available B system channel in what is typically referred to as a "roaming" mode. When roaming, the A system-preferred user typically pays a higher cost per call to use a B system channel.

Since operation of the emergency phone 10 of the present invention does not require a cellular service agreement with any cellular service provider, the phone 10 need not prefer either cellular system over the other. Thus, the emergency phone 10 may seek an available channel in either the A system or the B system.

With reference to FIG. 10A, the receiver 56 of a preferred embodiment proceeds to scan first through B system channels (step 110) looking for a signal of sufficient strength to support a cellular call (step 112). The B system preference is determined by the A/B preference parameter recalled from memory at step 108. If no signal is found in the B system channels having a signal strength greater than a minimum threshold value, the receiver 56 then scans through the cellular A system channels (step 114). If no signal is found in the A system channels having a signal strength greater than the minimum threshold value, the low signal indicator light 70 is illuminated (step 116), and the receiver 56 starts scanning the B system channels again (step 110). This process continues until a signal of sufficient strength is found in the A or B system channels.

When an available channel having sufficient signal strength is found in either the B system channels (step 112) or the A system channels (step 118), the high signal indicator light 72 is illuminated (step 120). If more than one channel having a signal strength greater than the minimum threshold is found, the channel having the highest signal strength is selected for the call (step 122).

It should be appreciated that, depending on the preference parameter stored in the memory 54, the phone 10 could search for an available channel on the A system first, and then search in the B system if a signal of sufficient strength is not found in the A system. Thus, the A/B preference can be set at the time that the phone is manufactured by the selection of the value of the preference parameter stored in memory 54. As described in more detail below, this parameter may also be reprogrammed after the manufacture of the phone 10.

As shown in FIG. 10B, after channel selection, the microprocessor 44 retrieves from the memory device 54 the telephone number of the emergency response center that has been stored therein (step 124). Preferably, the number stored in the memory 54 is "911", which is associated with all public emergency response centers in the United States. However, it should be appreciated that the invention is not limited to calling 911 centers. For example, the telephone number of a private emergency response service, instead of 911, could be stored in the memory 54.

When the telephone number of the emergency response center has been retrieved from memory 54, the cellular transmitter 62 transmits an outgoing cellular signal on the selected cellular channel (step 126) and the in-use indicator light 74 begins flashing (step 128).

Note that all of the events that have occurred thus far in the calling process (steps 106–128) have been initiated by the press of the single activation button 20. Thus, once powered-on, the microprocessor 44 executes its preprogrammed instructions to automatically scan for an available channel, retrieve the telephone number, and place the cellular call without any further action on the part of the user.

At this point, the emergency response center answers the call from the emergency phone 10 by transmitting a cellular signal referred to herein as an incoming cellular signal. As shown in FIG. 10B, the receiver 56 receives the incoming cellular signal (step 130), and the in-use indicator light 74 remains constantly on (step 132) to indicate to the user that communication with the emergency response center has been established. Preferably, the microphone 24 and the speaker 22 are then enabled (step 134).

Based on the incoming cellular signal from the emergency response center, the receiver 56 produces an incoming voice signal (step 136), which is preferably an electrical audio signal. The incoming voice signal is provided to the speaker 22 to produce audible sound (step 138). Typically, the audible sound produced by the speaker at this juncture will be the voice of a person at the emergency response center inquiring as to the nature of the emergency.

With continued reference to FIG. 10B, the user of the emergency phone 10 speaks into the microphone 24 to relay the nature of the emergency to the emergency response personnel (step 140). The microphone 24 receives the audible sound of the user's voice and produces an outgoing voice signal based thereon (step 142). The outgoing voice signal is provided to the cellular transmitter 62 (step 144), and the transmitter 62 transmits an outgoing cellular signal to the emergency response center based on the outgoing voice signal (step 146).

When the user wishes to terminate the call to the emergency response center, the user presses the button 20 for a second time, and holds the button 20 for a minimum period of time, such as one second. When the microprocessor 44 determines that the button 20 is pressed and held while the phone 10 is powered up, the microprocessor 44 causes the phone 10 to power down. Requiring that the button 20 be held down for a minimum time prevents accidental termination of the emergency call due to an inadvertent pressing of the button 20.

Thus, as indicated by the flow chart of FIGS. 10A and 10B, all of the steps involved in making an emergency telephone call to an emergency response center are accomplished by a single press of the single activation button 20 on the emergency phone 10. This makes it much simpler for a person who is distracted by a stressful situation, or who may be in some way partially incapacitated, to place an emergency call during a crisis.

By comparison, using a conventional cellular phone to place a call to a 911 emergency response center requires that a user press at least four separate control buttons: the power button once, the "9" button once, the "1" button twice, and the "SEND" button (or equivalent) once. To end a call using a conventional cellular phone, the user must typically press the "END" button (or equivalent) once, and then the power button once. Thus, establishing and ending a 911 emergency call using a conventional cellular phone requires at least seven presses of five different buttons. Only two presses of the single activation button 20 are required with the emergency phone 10 of the present invention.

With reference again to FIG. 8, the interface port 60, such as an RS232 interface, allows the processor 44 of the emergency phone 10 to communicate with an external device. In one embodiment of the invention, the external device is a geographical locating device, such as an external GPS unit 66. In this embodiment, the GPS unit 66 provides positional coordinate data to the phone 10 by way of the interface port 60. This positional data may then be transmitted to the emergency response center to give the emergency response personnel an exact position of the phone 10. Preferably, the GPS unit 66 is in a relatively small modular housing which may be removably connected to the phone housing 12, such as by a latching mechanism. The modular housing of the GPS unit 66 includes an interface connector that mates with the interface port 60 when the housing of the GPS unit 66 is connected to the phone housing 12. Alternatively, the GPS unit 66 may communicate with the interface port 60 by way of an interface cable.

As shown in FIG. 8, the GPS unit 66 preferably includes a modular mapping card 80. The mapping card 80 is a memory device which correlates latitude/longitude coordinates, as typically provided by a GPS system, to X-Y (rectangular) coordinates in feet or miles. Preferably, the X-Y coordinates provided by the mapping card 80 are relative to some local landmark. In this manner, the positional data that the phone 10 transmits to the emergency response center may be more easily used by emergency response personnel in mapping the exact position of the emergency phone 10.

The interface port 60 is also useful in providing access to the microprocessor 46 and memory 54 for programming purposes. For example, the interface port 60 may be used change or update the outgoing emergency telephone number stored in the memory 54. This function is especially important since there is no keypad such as is typically used on conventional cellular phones for reprogramming purposes. As shown in FIG. 8, a phone number programming unit 68, such as a palm-top or lap-top computer, may be connected to the interface port 60 to provide commands to the processor 46 to stored the outgoing telephone number to the memory 54.

One skilled in the art will appreciate the interface port 60 may also be used to update the software instructions that are executed by the processor 44 when the activation button 20 is pressed. For example, the sequence of A/B cellular system scanning as described above could be updated to take advantage of future changes in cellular service provider procedures or future FCC rulings that may affect how emergency calls are handled by service providers. Also, system parameters that are stored in the memory 54 may be updated by way of the interface port 60. For example, the A/B system preference parameter may be changed to prefer the A system channels over the B system channels, such that the A system channels are scanned first.

Figure 7:
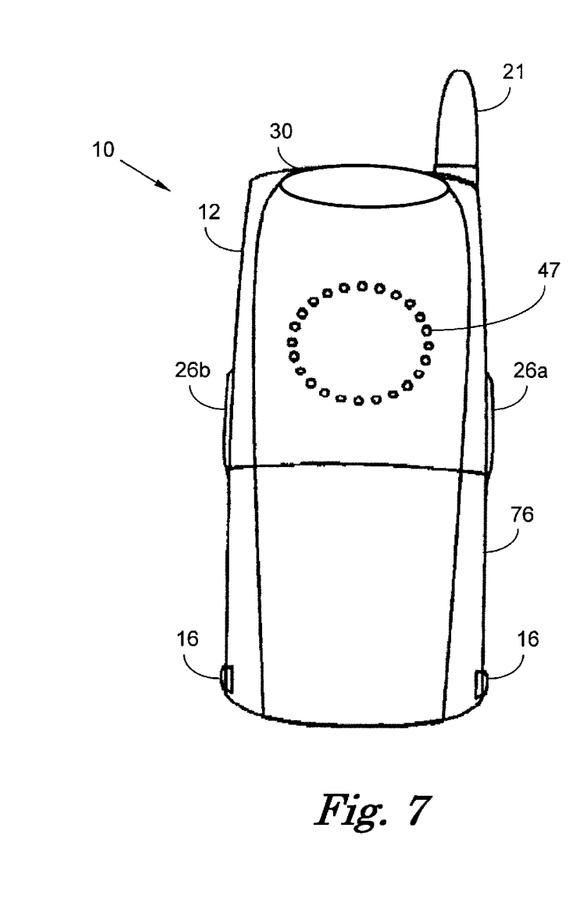
FIG. 7 depicts a bottom view of the emergency phone according to the most preferred embodiment of the invention.
Figure 8:
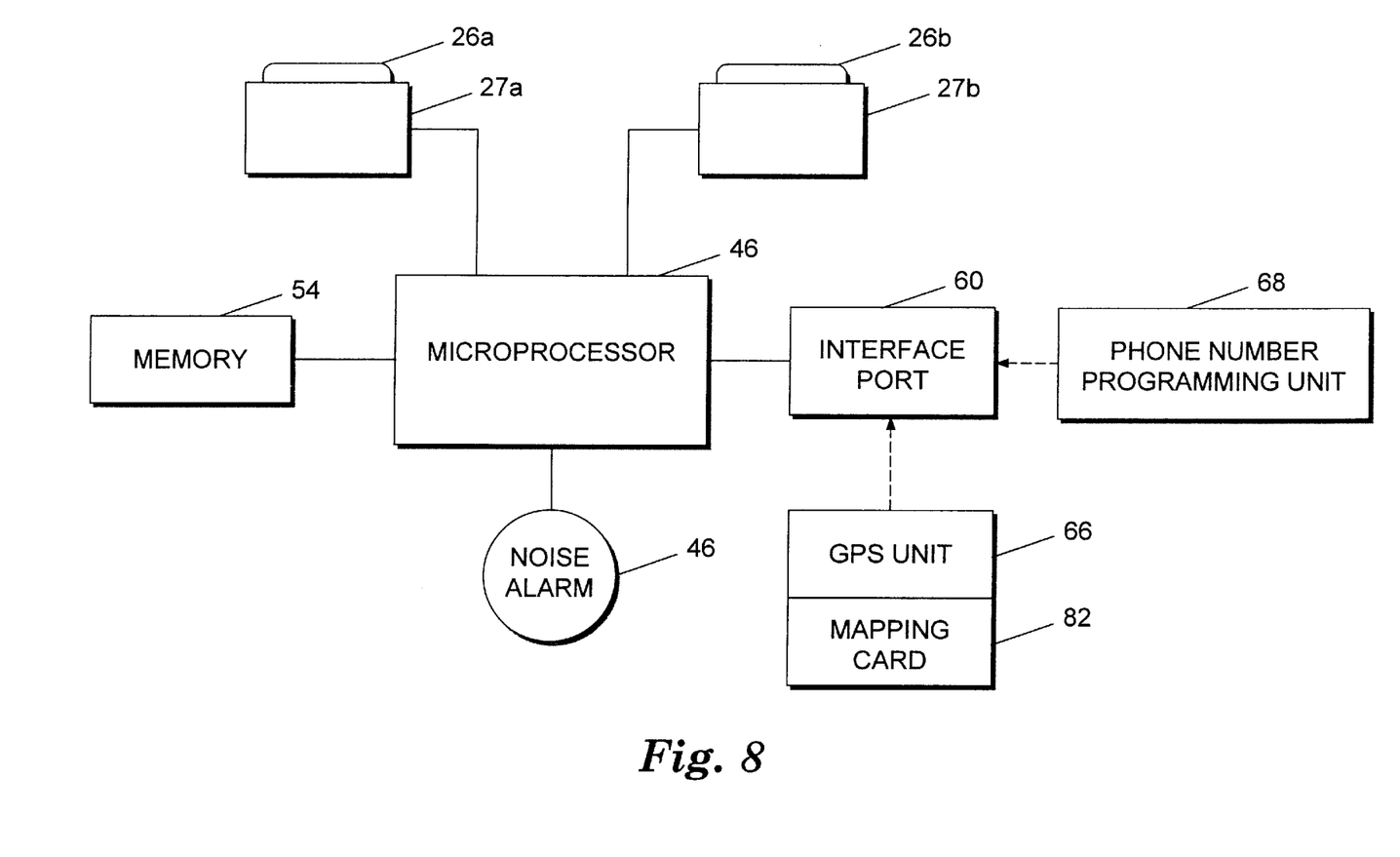
FIG. 8 is a functional block diagram indicating further functional components of the emergency phone according to a preferred embodiment of the invention.
Figure 11:
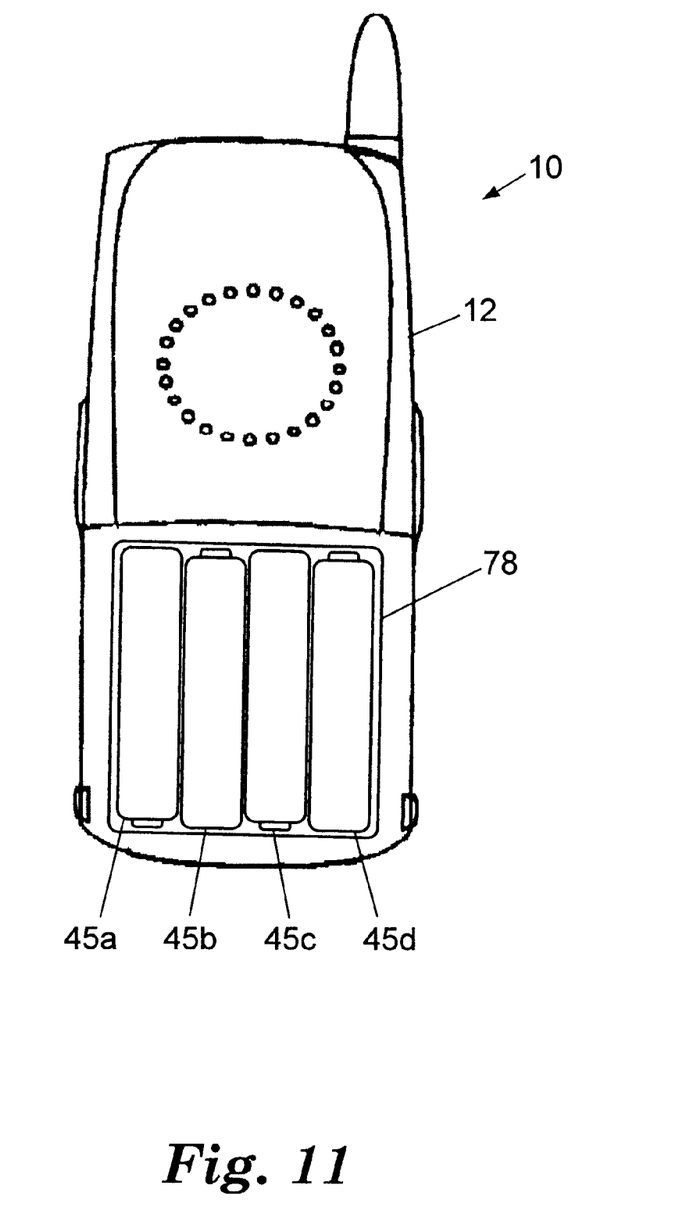
FIG. 11 depicts a bottom view of the emergency phone with a battery compartment revealed according to the most preferred embodiment of the invention.

As shown in FIG. 7, the preferred embodiment of the invention includes a battery compartment cover 76 which snaps securely into place in the housing 12. Removal of the battery compartment cover 76 reveals the battery compartment 78 as shown in FIG. 11. Within the battery compartment 78 are preferably four batteries 45a, 45b, 45c, and 45d, such as AAA alkaline batteries, which comprise the power supply 45 (see FIG. 3). In addition to the advantages discussed previously, these types of batteries are preferred to power the emergency phone 10 because they are so easy to find for purchase at most department stores, hardware stores, grocery stores, and convenience stores. In contrast, consider that conventional cellular phones require custom-sized battery packs that are typically compatible only with one model of phone. Replacement battery packs for conventional cellular phones typically may only be found at specialty stores, such as phone accessory stores or electronic supply stores. Thus, because of the relative ease in finding replacement batteries, the emergency phone 10 offers yet another significant advantage over conventional cellular phones.

The design of the battery compartment 78 and the battery compartment cover 76 of the emergency phone 10 also makes the emergency phone 10 more rugged than the conventional cellular phone. In most conventional cellular phones, the battery packs constitute a significant portion of the phone housing. Usually, the conventional cellular phone battery pack is integrated into a single modular unit which may be snapped into place to form a portion of the phone housing. If the conventional phone is dropped or hit, the conventional battery pack is susceptible to being dislodged from the phone housing. If this were to occur during an emergency call, communication with the emergency response center would be lost.

In contrast, the preferred embodiment of the emergency phone 10 is significantly less susceptible to battery failure, even if the phone 10 is dropped or jarred. First, the battery compartment cover 76 provides protection for the batteries 45a–45d held within the compartment 78. Further, since the batteries 45a–45d are separate from the cover 76, an impact which may dislodge the cover 76 would not necessarily dislodge the batteries 45a–45d. Thus, the emergency phone 10 could remain operational even if the battery compartment cover 76 comes off.

Figure 12:
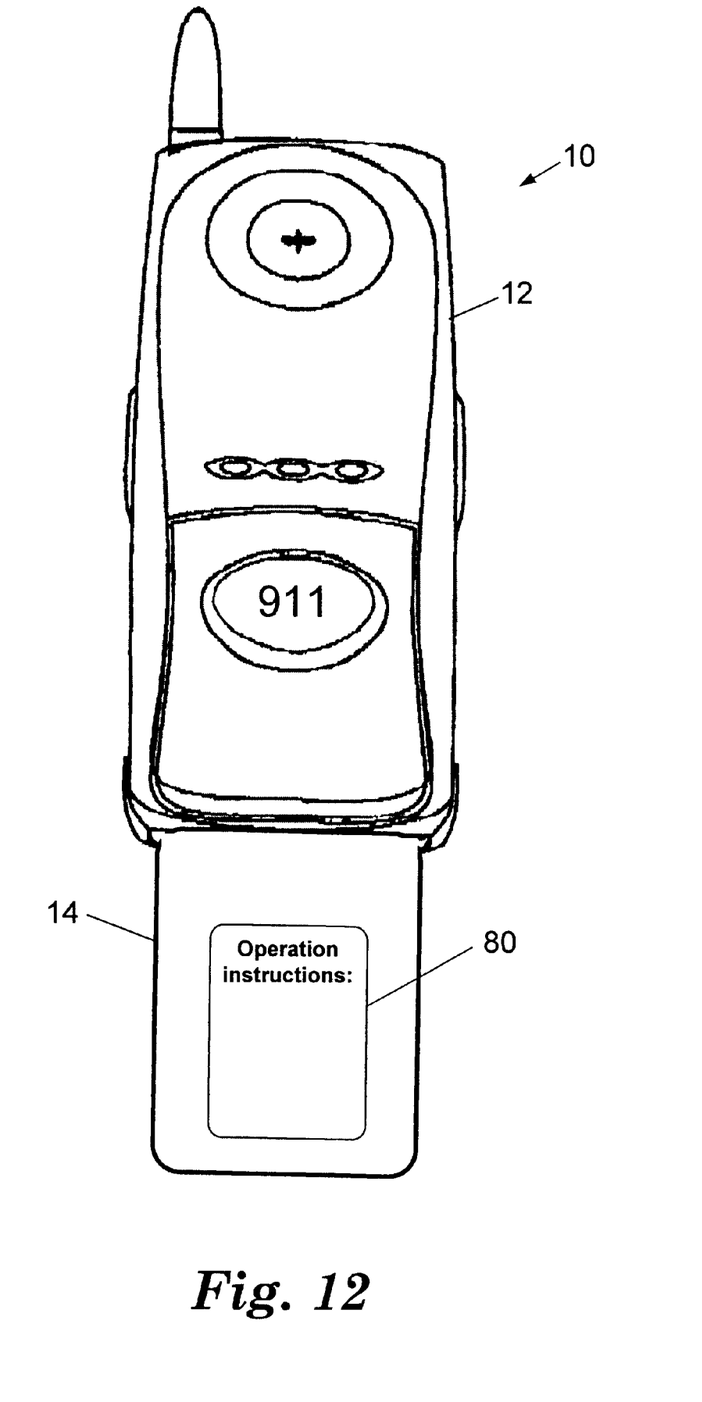
FIG. 12 depicts a top view of the emergency phone with the protective cover in an open position according to the most preferred embodiment of the invention.

FIG. 12 illustrates yet another advantageous feature of the emergency phone 10. When the protective cover 14 is in the open position, operation instructions 80 are visible to the user on the inside surface of the cover 14. Preferably, these operation instructions 80 include written and illustrated instructions on how to use the phone 10 to place an emergency call to an emergency response center, and how to activate the audible alarm 46. These instructions 80 may be screen printed directly onto the inside surface of the plastic cover 14, or are preferably printed on a stick-on label which is applied to the inside surface of the cover 14.

Of course, since only one button 20 is used to activate the phone and place a call, the instructions 80 are fairly simple and straightforward. However, the first time that a user actually needs to use the phone 10 may be in the midst of a stressful, confusing, or dangerous situation. In such a situation, having the operating instructions 80 provided on the cover 14 could save valuable time. Also, since the emergency phone 10 is intended for emergency use only, considerable time may pass between uses. Because the phone 10 may not be used very often, even though the user may have used the phone 10 before, the user may forget how it operates when the user is in a stressful situation. Thus, the operation instructions 80 provide a handy and quick reminder.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An emergency communication apparatus comprising:

a cellular transmitter;

a cellular receiver;

a power supply for providing power to the cellular transmitter and receiver; and a single call activation switch which, when closed, provides power from the power supply to the cellular transmitter and receiver, activates the cellular receiver to search for an available cellular system channel, and activates the cellular transmitter to transmit an outgoing cellular signal, the apparatus having no switching devices other than the single call activation switch for providing power from the power supply to the cellular transmitter and receiver, activating the cellular receiver to search for an available cellular system channel, and activating the cellular transmitter to transmit an outgoing cellular signal.

2. A cellular telephone having a rigid housing containing a cellular transmitter, a cellular receiver, and a power supply for providing power to the cellular transmitter and receiver, the cellular telephone further comprising:

a single call activation switch disposed within the rigid housing which, when activated by an operator of the telephone, provides power from the power supply to the cellular transmitter and receiver, activates the cellular receiver to search for an available cellular system channel, and activates the cellular transmitter to transmit an outgoing cellular signal, the power supply, cellular transmitter, and cellular receiver requiring no means for activation other than the single call activation switch.

3. The cellular telephone of claim 2 further comprising:

a microprocessor for controlling the cellular telephone based on execution of a set of operational instructions;

the single call activation switch, when activated the first time, causing the electrical power from the power supply to be provided to the microprocessor, thereby energizing the microprocessor to begin executing the set of operational instructions.

4. The cellular telephone of claim 2 further comprising:

the microprocessor for controlling the cellular receiver based on execution of the set of operational instructions;

the single call activation switch, when activated the first time, causing the electrical power from the power supply to be provided to the cellular receiver, thereby energizing the cellular receiver; and the cellular receiver for scanning for a strongest cellular signal from among available cellular system channels based on the set of operational instructions executed by the microprocessor.

5. The cellular telephone of claim 4 further comprising the microprocessor and receiver for determining a strongest B cellular signal from among cellular signals found in B cellular system channels when the single call activation switch is activated the first time, for determining whether the strongest B cellular signal has a signal strength greater than a minimum threshold, and for determining a strongest A cellular signal from among cellular signals found in A cellular system channels when the strongest B cellular signal has a signal strength less than the minimum threshold.

6. The cellular telephone of claim 4 further comprising the microprocessor and receiver for determining a strongest A cellular signal from among cellular signals found in A cellular system channels when the single call activation switch is activated the first time, for determining whether the strongest A cellular signal has a signal strength greater than a minimum threshold, and for determining a strongest B cellular signal from among cellular signals found in B cellular system channels when the strongest A cellular signal has a signal strength less than the minimum threshold.

7. The cellular telephone of claim 4 further comprising:

a low signal indicator light attached to the housing; and the microprocessor for causing illumination of the low signal indicator light if the signal strength of the strongest signal is less than the minimum threshold when the single call activation switch is activated the first time.

8. The cellular telephone of claim 4 further comprising:

a high signal indicator light attached to the housing; and the microprocessor for causing illumination of the high signal indicator light if the signal strength of the strongest signal is greater than the minimum threshold when the single call activation switch is activated the first time.

9. The cellular telephone of claim 4 further comprising:

a memory device for storing a telephone number associated with a response center;

the microprocessor for accessing the telephone number from the memory device and for activating the cellular transmitter, if the signal strength of the strongest signal is greater than the minimum threshold when the single call activation switch is activated the first time; and the cellular transmitter for transmitting the cellular phone signal when activated by the microprocessor to attempt to establish full-duplex cellular communication with the response center.

10. The cellular telephone of claim 9 further comprising the microprocessor for determining whether cellular communication with the response center has been successfully established, and, if cellular communication with the response center has not been successfully established, waiting a predetermined period and then activating the cellular transmitter to again attempt to establish full-duplex cellular communication with the response center.

11. The cellular telephone of claim 3 further comprising:

an interface port electrically connected to the microprocessor and accessible through the housing; and the microprocessor operable to exchange signals with an external device via the interface port.

12. The cellular telephone of claim 2 further comprising the single call activation switch for causing activation of the cellular telephone to establish full duplex cellular voice communication with a response center only when the single call activation switch is activated for longer than a minimum period of time, thereby preventing accidental activation of the cellular telephone and inadvertent communication with the response center.

13. The cellular telephone of claim 2 further comprising:

activation prevention means for preventing inadvertent activation of the cellular telephone, the activation prevention means including a rigid cover member movably attached to the rigid housing, and movable from a closed position at which the rigid cover member covers the single call activation switch to an open position at which the rigid cover member does not cover the single call activation switch; and the single call activation switch being the only control switch disposed beneath the rigid cover member when the rigid cover member is in the closed position.

14. The cellular telephone of claim 13 wherein the activation prevention means further comprise:

the rigid cover member having a first edge and an opposing second edge;

a hinge member disposed at the first edge of the cover member for engaging the housing to form a hinged connection thereto; and a latch member disposed at the second edge of the cover member for making a latched connection to the housing when the cover member is in the closed position.

15. The cellular telephone of claim 13 wherein, after communication has been established between the cellular telephone and the response center, the cellular transmitter and cellular receiver are operable to support full-duplex voice communication between the cellular telephone and the response center with the rigid cover member in the closed position, the rigid cover member thereby preventing accidental deactivation of the cellular telephone and inadvertent termination of communication with the response center.

16. The cellular telephone of claim 11 further comprising:

locator means electrically connected to the interface port for providing location signals indicating a physical location of the cellular telephone;

the interface port for receiving the location signals from the locator means, and providing the location signals to the microprocessor; and the microprocessor for receiving the location signals from the interface port, and providing the location signals to the cellular transmitter for transmission to a response center.

17. The cellular telephone of claim 16 wherein the locator means further comprise a Global Positioning Satellite system receiver.

18. The cellular telephone of claim 2 wherein the power supply further comprises:

a battery compartment for retaining a plurality of replaceable batteries therein, the battery compartment formed by a cavity in the rigid housing, whereby the plurality of batteries are recessed within the housing;

the plurality of replaceable batteries disposed within the battery compartment; and a battery compartment cover, operable to removably attach to the rigid housing and enclose the battery compartment, thereby protecting the plurality of replaceable batteries.

19. The cellular telephone of claim 18 wherein the plurality of replaceable batteries further comprise alkaline batteries.

* * * * *